United States Patent [19]

Wild

[11] Patent Number: 4,756,121

[45] Date of Patent: Jul. 12, 1988

[54] AUTOMATIC IRRIGATION DEVICE FOR CULTIVATED SOIL

[76] Inventor: Alexander Wild, Rathausgasse 30, CH-3011 Bern, Switzerland

[21] Appl. No.: 796,973

[22] Filed: Nov. 12, 1985

[30] Foreign Application Priority Data

Nov. 13, 1984 [CH] Switzerland .................... 5428/84
Mar. 29, 1985 [CH] Switzerland .................... 1347/85

[51] Int. Cl.$^4$ .............................................. A01G 25/00
[52] U.S. Cl. .......................................... 47/80; 47/48.5
[58] Field of Search ................ 47/66, 80, 79, 81, 73, 47/81, 48.5

[56] References Cited

U.S. PATENT DOCUMENTS

| 3,192,665 | 7/1965 | Cloud | 47/80 |
| 3,810,329 | 5/1974 | Lecuru et al. | 47/87 |
| 4,001,967 | 1/1977 | Swift et al. | 47/80 |
| 4,024,670 | 5/1977 | Stanley | 47/73 |
| 4,067,143 | 1/1978 | Alwell | 47/81 |
| 4,083,147 | 4/1978 | Garrick | 47/80 |

FOREIGN PATENT DOCUMENTS

| 1003488 | 2/1957 | Denmark | 47/80 |
| 1168485 | 12/1958 | France | 47/80 |
| 1241980 | 8/1960 | France | 47/80 |
| 1492789 | 7/1967 | France | 47/81 |
| 1572701 | 7/1980 | United Kingdom | 47/80 |

Primary Examiner—Robert A. Hafer
Assistant Examiner—Bradley M. Lewis
Attorney, Agent, or Firm—Brady, O'Boyle & Gates

[57] ABSTRACT

The device consists of a wall (4–7) surrounding a reservoir (9) for the water, this wall having at the top a tightly sealable (11) opening (12) for introduction of the water and at the bottom two passages (17, 18) for the discharge of water and the entrance of air. The wall areas provided with the passages (17, 18) directly adjoin the soil to be irrigated.

The device can be constituted by a container (1) with a double-walled shell (2) and bottom (3). In this arrangement, two passages (17, 18) are provided in the downwardly curved inner wall (7) of the bottom (3), the spacing between these passages being dimensioned to be small.

The irrigation device is simple and inexpensive. It discharges only the quantity of water required by the plants so that the water reservoir lasts for a long time and danger of bogginess of the soil is avoided.

10 Claims, 5 Drawing Sheets

AUTOMATIC IRRIGATION DEVICE FOR CULTIVATED SOIL

The invention relates to an automatic irrigation device for cultivated soil.

BACKGROUND OF THE INVENTION

Cultivated soil is understood to mean earth, humus, and the like, suitable for gardening or agriculture and planted or sowed with seedlings or plants.

SUMMARY OF THE INVENTION

The invention characterized in claim 1 solves the object of providing a simple and inexpensive irrigation device.

The features indicated in claims 2-5 achieve the object that irrigation is interrupted respectively after releasing an amount of water that is very small as compared to the stored volume until such amount has been absorbed by the plants; as a consequence, only so much water is distributed as required by the plants, the water reservoir lasts for a long time, and the danger of bogging of the soil is avoided. The essential aspect in this connection resides in that only a few and very small passages are provided, preferably only two passages having an inside diameter in the range of 0.5-5 mm, for example, 1 mm, and preferably in the range of 0.5-2 mm, and that their spacing is small, preferably only n·1 cm and at most n·3 cm wherein n is the number of liters of the reservoir volume. Preferably, the passages are designed so that only a negligible capillary effect occurs in spite of their small width. If the wall thickness is larger than the inside diameter of the passages of, for example, 1 mm, the passages for this reason are suitably fashioned to taper, so that they have the small inside diameter of, for example, 1 mm only at the tapered end.

BRIEF DESCRIPTION OF THE DRAWINGS

The invention and its preferred features will be described in greater detail below with reference to the embodiments illustrated in the drawings wherein:

FIG. 6 shows an irrigation device for being embedded in earth, and FIG. 7 is a top view of part of the device according to FIG. 6.

DESCRIPTION OF THE PREFERRED EMBODIMENTS

Figure 1:
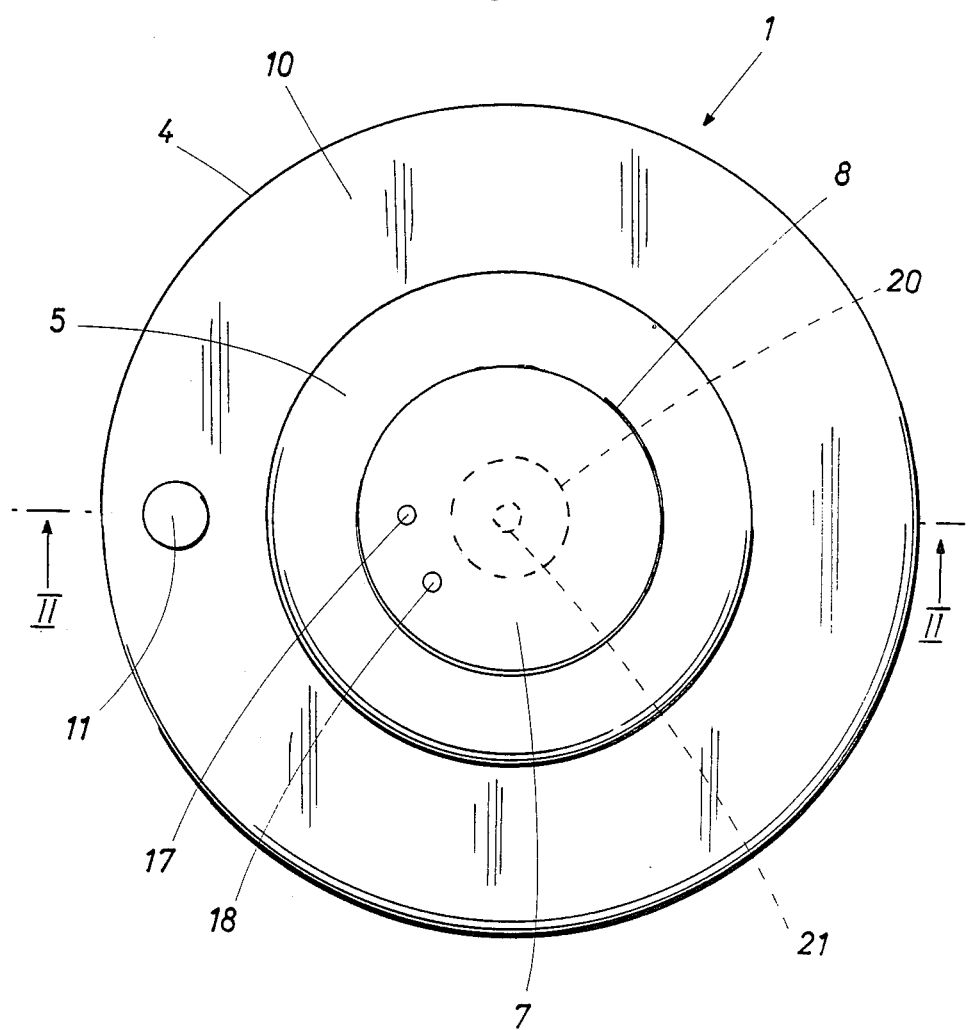
FIG. 1 is a top view of an irrigation device designed as a tank.
Figure 2:
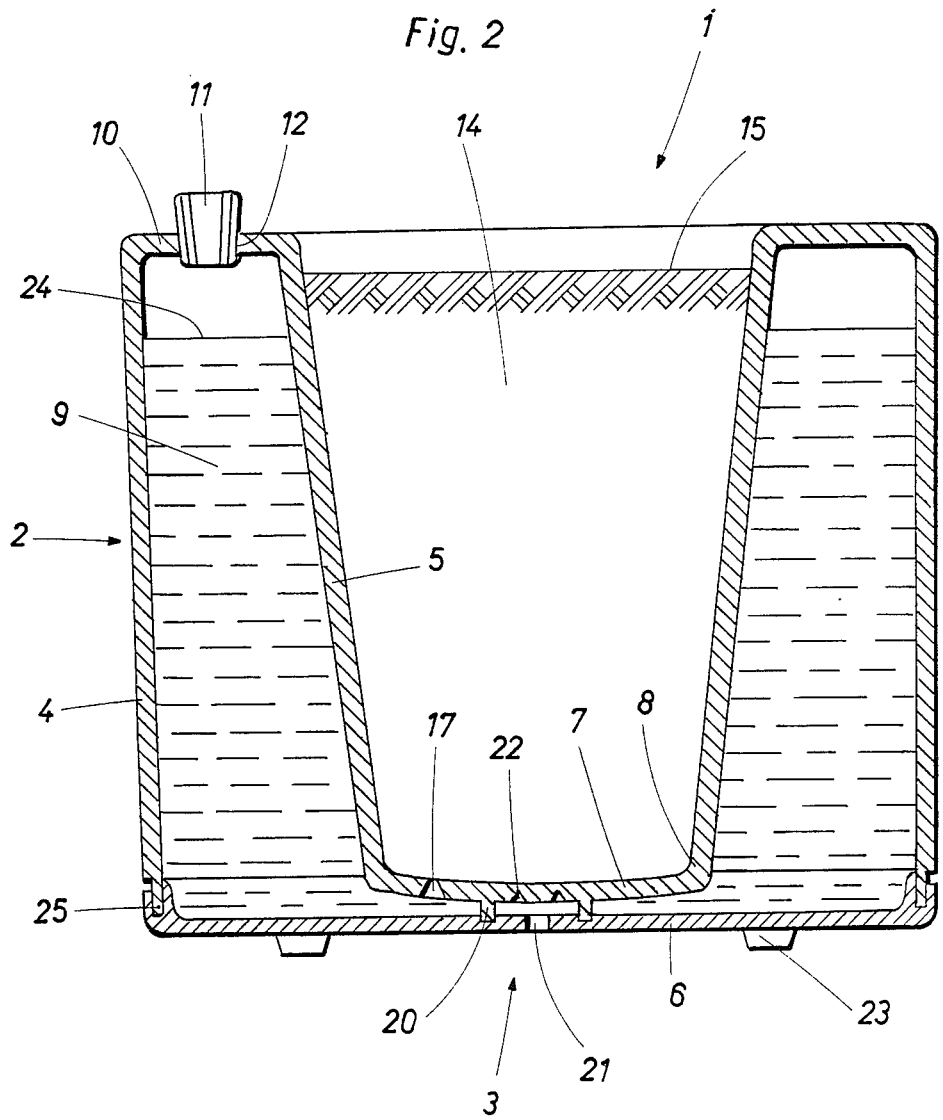
FIG. 2 is a cross section through the tank along line II—II in FIG. 1.

The irrigation device shown in FIGS. 1 and 2 consists of a tank 1 with a double-walled shell 2 and a double-walled bottom 3. The outer wall 4 of the shell 2 is cylindrical; the inner wall 5 tapers conically toward the bottom. The outer wall 6 of the bottom 3 is planar; the inner wall 7 is curved downwards from the edge 8. The reservoir space for the water, encompassed by the outer and inner walls 4–7 of the shell and bottom 2 and 3 is denoted by 9. The shell 2 has an opening 12 that can be sealed airtight by a rubber stopper 11 at its upper, annular rim 10 for introduction and/or refilling of the water into the reservoir space 9. The interior 14 of the tank is filled with soil 15. Two passages 17, 8 are provided in the inner wall 7 of the bottom 3. The two passages are made of identical dimensions and are arranged at equal spacings from the edge 8 of the bottom, i.e. at the same level. The mutual spacing of the two passages 17, 18 is 1.5 cm and is dimensioned according to the formula n·1 cm wherein n is the number of liters of the reservoir volume. (In the embodiment, the storage space 9 has a capacity of 1.5 liters.) The pasages 17, 18 taper conically in the upward direction toward the inner chamber 14 and their inside diameter, i.e. the hole diameter at the tapered end, is 1 mm.

A ring 20 is integrally formed at the underside of the inner wall 7 of the bottom, this ring being seated tightly in an annular groove of the outer wall 6 of the bottom. The portion of the outer wall 6 surrounded by the ring 20 has a hole 21, and the portion of the inner wall 7 surrounded by the ring has a predetermined breaking point 22 formed by a notch-like annular groove for the breaking out of a hole.

The tank 1 is composed of two pieces manufactured from a synthetic resin by injection molding. The walls 4, 5, 7 with the rim 10 and the ring 20 constitute one piece; the wall 6 with feet 23 integrally formed thereat constitutes the other piece. The two pieces are joined to the wall 6 by a splined connection 25 of the rims of walls 4 and 6, glued with an adhesive and thus sealed off, as well as by a correspondingly sealed splined connection of the lower rim of the ring 20.

The irrigation device constituted by the container 1 operates as follows: While water is filled in through the opening 12, air is displaced from the reservoir 9 and exits via the opening 12 and the passages 17, 18. After the reservoir 9 is filled with water, the opening 12 is sealed airtight by the stopper 11. At this point in time, water will still be discharged from the passages 17, 18 until the suction pressure acting on the water column, which suction pressure is produced due to the vacuum formed above the water level 24 in the upper portion of the reservoir 9, is of equal size as the weight of the water column. Without any soil, the flow of water through the passages 17, 18 would now cease entirely. However, the soil adjoining the passages 17, 18 and wetted during the filling step initially will still absorb some water by capillary action so that the water column does not remain in its equilibrium position (suction pressure=weight of water), but rather is pulled downwardly to a small extent against the suction pressure. The water column now has the desire—under the effect of the suction pressure of the vacuum—to return into the equilibrium position. This, though, cannot be accomplished at first because the earth surrounding the passages 17, 18 has a high moisture content and is therefore air-impermeable. Watering will now remain interrupted until the plant has absorbed the water from the soil, and the ground at one of the two passages 17, 18, for example passage 17, has dried out to such an extent that the air can pass through the soil 14 to this passage. The air is then taken in through the passage 17 and rises as an air bubble into the upper part of the reservoir 9 whereby the vacuum is diminished. Water will now exit from the other passage 18 to the extent that air is taken in. The entrance of air into the passage 17 is stopped as soon as the water discharged from the other passage 18 passes to the passage 17, and the earth at that point has again become adequately moist for sealing this passage. The earth is thus utilized, so to speak, as a moisture-dependent sealing means, preventing the entrance of air into the passages as soon as its moisture content has become adequately large. Consequently, irrigation takes place which is automatically controlled by the moisture content of the soil.

Based on these realizations, found in the scope of the present invention, regarding the mode of operation of the irrigation device, the following result ensues: The extent of irrigation depends essentially on the spacing of the two pasages 17, 18: The larger the spacing, the more intensive is the irrigation. For this reason, the two passages 17, 18 are arranged, as set forth above, in close proximity to each other, but still so far apart that the usual foreign bodies contained in the soil, such as stones or the like, cannot cover both passages; this is so, because the device, for the above reasons, works only if the earth adjoins directly at least one of the two passages. If the spacing of the two passages 17, 18 is chosen to be too large, then excess watering results, and there is the danger that the soil becomes boggy, and the plants will not flourish. The spacing can be chosen to be larger if the water volume and correspondingly the amount of soil to be irrigated are very large. The limit at which the danger of excess watering becomes intolerably high lies approximately at a hole spacing of n·3 cm, wherein n is the number of liters of the reservoir volume.

Once the water stored in reservoir 9 has been consumed, in the embodiment normally after about 2 months, refilling initially is neither required nor desirable because the soil is still moist. It has been found that the plants flourish substantially better when refilling is postponed until the soil has been approximately dried out. This can be recognized by the fact that the earth 15, contracting during the drying out process; detaches itself from the shell wall 5. Only once a pronounced annular gap has been formed between the earth 15 and the wall 5 should the reservoir 9 be refilled with water.

It is essential in this connection that the passages 17, 18 are arranged at a distance from the shell wall 5 and, respectively, from the rim 8 in the bottom wall 7, and that the latter is curved downwardly. This ensures that even the dried-out clump of earth 15 located at a spacing from the shell wall 5 still is in reliably firm contact with the passages 17, 18. This is necessary so that the irrigation device, after water has been replenished in the reservoir 9, again works reliably. Although water is discharged from the pasages 17, 18 during refilling, this quantity of water is not enough to strongly moisten the clump of earth to such an extent that it again expands up to the shell wall 5. Therefore, a gap will remain between the soil and the shell wall 5, and if the pasages are arranged in the latter, or immediately at the rim of the bottom wall, then irrigation is interrupted with finality as soon as the corresponding vacuum has been attained in the upper reservoir portion.

In case the device is set up in the open air, for example if it is to be installed in a flower bed, the predetermined breaking point 22 is broken through by means of a tool introduced through the hole 21. In this way, a drain hole is produced through which rainwater can flow out of the interior 14 of the tank. Since the broken-out drain hole is located at the lowermost point of the inner wall 7 of the bottom, no rainwater can collect in the interior of the tank. And because there is an interspace between the two drain holes of the walls 6 and 7, the soil 15 located in the interior 14 will definitely not directly adjoin the soil located underneath the outer wall 6. Consequently, the water exiting from the passages 17, 18 is prevented from being absorbed by the soil surrounding the tank.

The ring 20 not only serves for separating the reservoir 9 from the drain holes but also acts as a spacer means between the outer and inner walls 6 and 7 of the bottom. The ring prevents these walls from moving toward each other in case of vibrations, thereby urging water outwards through the passages 17, 18.

Another essential factor for the reliable functioning of the device is that the air which has passed through one of the passages 17, 18 into the reservoir 9 will not remain in the zone of the passage but rather will rise up. This is ensured by the curved shape of the inner wall 7 of the bottom and, in case the tank is set up on an inclined support, by the circular shape of the ring 20, to which rising air bubbles cannot adhere.

Figure 3:
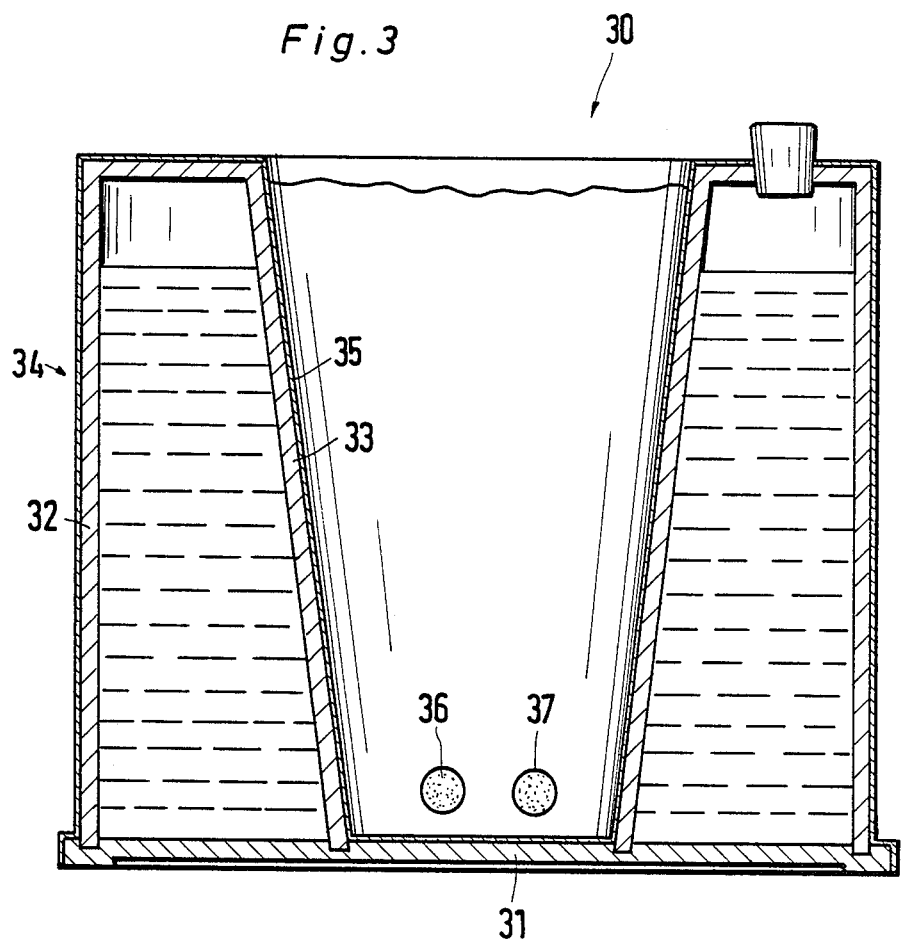
FIG. 3 shows another irrigation device fashioned as a tank.

The tank 30 illustrated in FIG. 3 differs from tank 1 as follows: Instead of a double-walled bottom, this tank has a merely single-wall bottom 31 wherein the lower rims of the outer and inner walls 32, 33 of the shell 34 are inserted. The shell 34 consists of porous clay to which has been applied, on the side facing away from the storage chamber, a glazed, water- and air-impermeable layer 35. Two zones 36, 37 have been left without glazing at the lower rim of the inner wall 33. The pores of the clay wall in these zones 36, 37 constitute the passages through which the air can enter the reservoir and water can exit therefrom. The bottom 31 can consist of some other material, or likewise of clay; in the latter case, the bottom must also be glazed on its underside.

For the reasons mentioned in connection with the mode of operation of the tank 1, care must be taken in case of tank 30 that the earth does not dry out to such an extent that it is detached from the inner wall 33 of the shell 34 in the region of the zones 36, 37. In order to avoid this drawback, the clay vessel 30 can, of course, also be shaped in correspondence with the tank 1 so that the unglazed zones 36, 37 can be located in the inner wall of the bottom.

Figure 4:
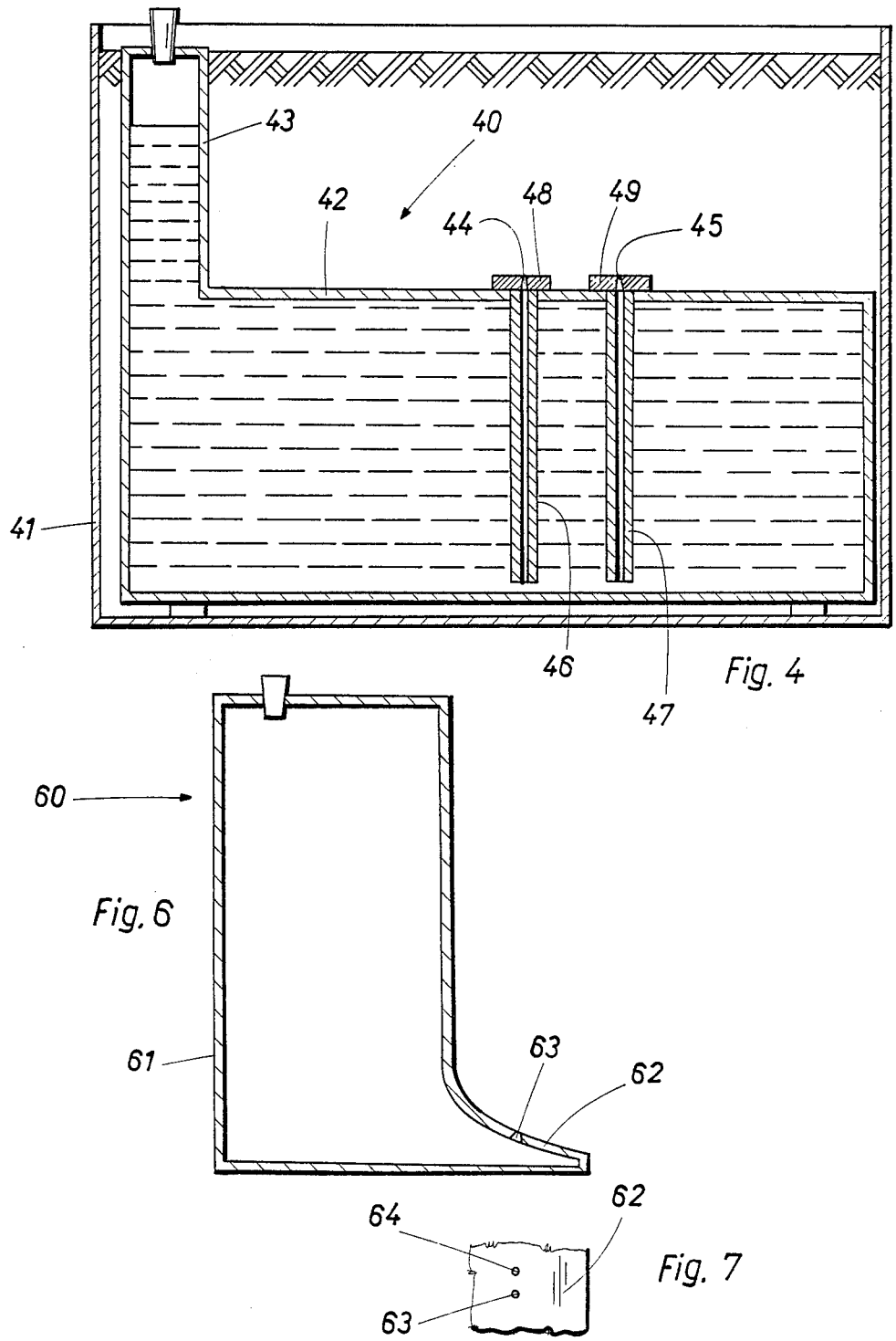
FIG. 4 is a cross section through an irrigation device designed as an insert for a box or a pot.

The irrigation device illustrated in FIG. 4 denoted by 40 is fashioned as an insert for a flower box 41 or a flowerpot. The device consists of a container 42, for example of a square shape, with an upwardly extending filling nipple 43 that can be tightly sealed by a plug. Two capillary tubes 46, 47 are arranged in the upper wall of the container 42 and extend into the close proximity of the container bottom. Each capillary tube 46, 47 is mounted at the top in a disk 48, 49, which latter has an upwardly tapering passage 44, 45 adjoining the bore for the capillary tube and is glued firmly onto the upper container wall. The device 40 operates besically in the same fashion as the tank 1 in that air enters the reservoir of the container 42 through one of the two capillary tubes 46, 47, and water exits through the respectively other capillary tube.

Figure 5:
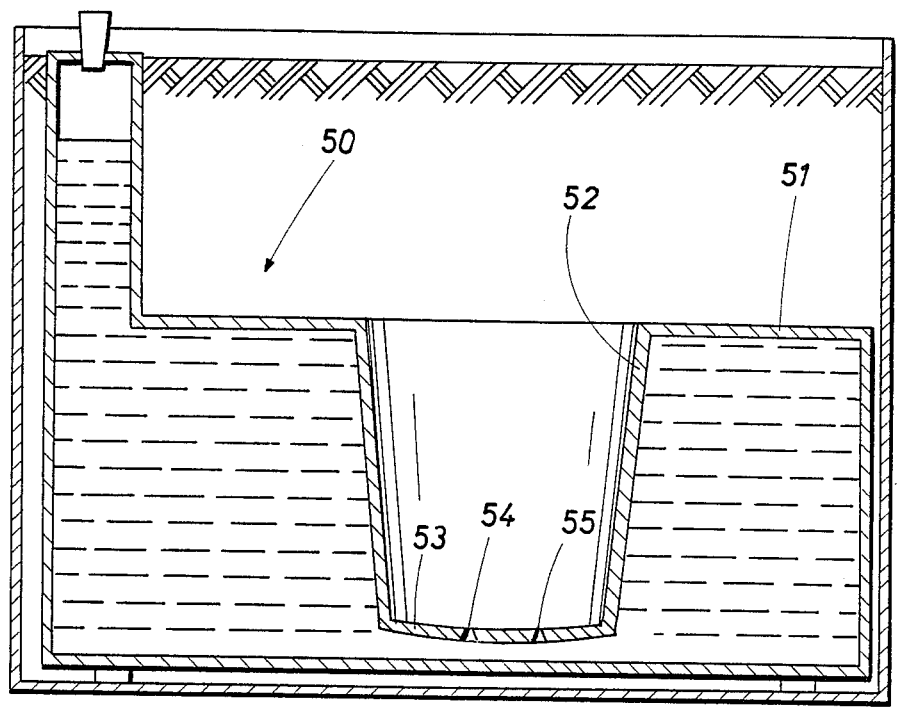
FIG. 5 is a cross section through another irrigation device fashioned as an insert for a box or a pot.

In the version 50 of the insert 40 illustrated in FIG. 5, the capillary tubes are omitted, and the upper part of the container wall 51 has instead a recess 52 extending almost to the container bottom and having approximately the same shape as the inner walls 5 and 7 of the shell and bottom 2 and 3 of the tank 1 and exhibiting in its bottom 53 likewise two passages 54, 55 corresponding to the passages 17 and 18. Suitably, this embodiment likewise comprises, in correspondence with the tank 1, a ring 20, a drain hole 21, and a predetermined breaking point 22 so that rainwater can be drained from the recess 52 of the device set up in the open air.

The irrigation device 60 illustrated in FIGS. 6 and 7 is intended for being embedded in the soil, for example in a flower bed, a flower box, and the like. It consists of a tank 61, for example a cylindrical tank, exhibiting at the top an opening which can be sealed off in an airtight fashion by a plug and having a foot 62 at the bottom; on the topside of this foot, which is inwardly curved and gradually rises from the foot end to a continuously increasing extent toward the vertical tank wall, two passages 63, 64 are provided corresponding to the passages 17 and 18 of the tank 1. Depending on the amount of the earth to be irrigated, several devices 60 can be embedded in the soil at mutual spacings.

It is also possible to provide more than two passages, especially in case of very large irrigation installations. In order to avoid excess watering, care must be taken also in this instance that all of the passages are in an area with maximum dimensions of n·3 cm, preferably n·1 cm, for example in a circular area with maximally this diameter (n = number of liters of reservoir volume).

Since it is necessary for the functioning of the irrigation device that at least one of the passages is not segregated from the soil by a stone and the like or by a cavity, an absorbent material can be arranged at the passages, this material, in turn, directly adjoining the soil. For example, at least one of the passages 17, 18 of the tank 1 can be covered by a piece of felt or another absorbent and/or porous material, the dimensions of the latter being such that a foreign body present in the soil can cover only a partial area of the material, thus ensuring a reliable communication of the soil with the absorbent material. However, it has been found that thereby irrigation takes place more quickly, and the danger of excess watering and thus bogginess of the soil arises. Therefore, this solution is suited practically only for the device 60 to be embedded, for example, in the open air into the ground.

The irrigation device can also be utilized for irrigation of cultivated beds in nurseries etc. For this purpose, the device can comprise a water tank, a pipeline network being connected to the underside of this tank. The passages in this arrangement are provided in the jackets of the pipes; the free ends of relatively large pipes are here to be sealed except for possible passages. In order to introduce the water, the water tank can comprise a connecting nipple for a waterline, which nipple can be closed by a blocking element. At the top in the tank wall, a check valve can be located through which the air escape from the tank while water is being filled in.

I claim:

1. Automatic irrigation device for cultivated soil, comprising a wall (4–7; 31–33; 42, 43; 51; 61) surrounding a reservoir (9) for water and having an opening for introduction of the water, a removable sealing means (11) airtightly sealing said opening (12), said wall having two passages (17, 18; 36, 37; 44, 45; 54, 55; 63, 64) for the discharge of water from said reservoir (9) and for the entrance of air into the reservoir, said reservoir being airtightly sealed by said wall (4–7; 31–33; 42, 43; 51; 61) and said sealing means (11) except for said two passages (17, 18; 36, 37; 44, 45; 54, 55; 63, 64), said two passages each having an outside end intended for adjoining soil to be automatically irrigated, said outside ends of said two passages being spaced-apart by a distance which is less than n·3 cm, wherein n is the number of liters of the reservoir volume, said passages having diameters in the range of 0.5–5 mm, whereby when soil to be automatically irrigated covers the outside ends of the two passages water from the reservoir can flow out of one of said passages only upon entrance of air through the other of said passages and the flow is stopped when the water after passing said distance reaches the outside end of the other of said passages, preventing the further entrance of air through the other of said passages allowing a vacuum to be formed in the reservoir above the level of the water therein.

2. Automatic irrigation device for cultivated soil, comprising a wall (4–7; 31–33; 42, 43; 51; 61) surrounding a reservoir (9) for water and having a opening for introduction of the water, a removable sealing means (11) airtightly sealing said opening (12), said wall having at least two passages (17, 18; 36, 37; 44, 45; 54, 55; 63, 64) for the discharge of water from said reservoir (9) and for the entrance of air into the reservoir, said reservoir being airtightly sealed by said wall (4–7; 31–33; 42, 43; 51; 61) and said sealing means (11) except for said at least two passages (17, 18; 36, 37; 44, 45; 54, 55; 63, 64), said at least two passages each having an outside end intended for adjoining soil to be automatically irrigated, said outside ends of said at least two passages lying in an area, the maximum extension of said area being less than n·3 cm, wherein n is the number of liters of the reservoir volume, said at least two passages having diameters in the range of 0.5–5 mm, whereby when soil to be automatically irrigated covers the outside ends of the at least two passages, water from the reservoir can flow out of one of said passages only upon entrance of air through another passage and the flow is stopped when the water covers said area, preventing the further entrance of air through one of said passages allowing a vacuum to be formed in the reservoir above the level of the water therein.

3. Device according to claim 1 or 2, characterized in that the inside diameter of the passage (17, 18; 36, 37; 44, 45; 54, 55; 63, 64) is at least 0.5 mm to 2 mm.

4. Device according to claim 2, characterized in that the passages (17, 18; 36, 37; 44, 45; 54, 55; 63, 64) are tapered.

5. Device according to claim 2, wherein said wall has an inner and an outer shell (4–7; 32, 33), the passages (17, 18; 36, 37) being arranged in the lower portion (7) of the inner shell (5, 7; 33), and the interior (14) of the inner shell being open at the top and adapted for being filled with soil (15).

6. Device according to claim 5 wherein the inner and the outer shell (4–7) each having a bottom (6, 7), the passages (17, 18) being holes in the bottom (7) of the inner shell (5, 7) arranged at a distance from the edge (8) thereof, and the bottom (7) of the inner shell (5, 7) from its edge being downwardly curved toward its center, so that air entering the reservoir (9) through one of the passage holes (17, 18) can rise along the bottom of the inner shell.

7. Device according to claim 5 wherein the inner and the outer shell (4–7) each have a bottom (6, 7), the passages (17,18) being holes in the bottom (7) of the inner shell (5, 7) arranged at a distance from the edge (8) thereof, and the bottom (7) of the inner shell (5, 7) being inclined so that air entering the reservoir (9) through one of the passage holes (17, 18) can rise along the bottom of the inner shell.

8. Device according to claim 7 or 6, characterized by at least one spacer means (20) supporting the bottoms (6, 7) of the inner and the outer shell with respect to each other.

9. Automatic irrigation device for cultivated soil, comprising a container (1) having an inner and an outer shell (4–7) each having a bottom (6, 7), said bottoms of said inner and outer shell having a central area, each central area haivng a drain hole (21) or a predetermined breaking point (22) to break out a drain hole, in order to permit rainwater to drain from the interior (14) of the container (1) set up in the open air, the peripheries of the central area of the bottoms (6, 7) being connected by a spacer ring (20), said container (1) surrounding a reservoir (9) for the water and having an opening for introduction of the water, a removable sealing means (11) airtightly sealing said opening (12), said inner shell (5, 7) having at least two passages (17, 18) outside said central area of said bottom for the discharge of water from the reservoir (9) and for the entrance of air into the reservoir, said at least two passages adapted for adjoining soil to be irrigated and having diameters in the range of 0.5–5 mm and being spaced-apart by a distance which is less than n·3 cm, wherein n is the number of liters of the reservoir volume, said container (1) being composed of two components (4, 5, 7, 10; 6), said ring (20) being formed at one of the components, the one component with the ring (20) being joined to the other component by a splined connection, said splined connection being glued with an adhesive and thus sealed off, said reservoir is airtightly sealed by said inner and outer shell (4–7), said ring (20) and said sealing means (11) except for said at least two passages (17, 18), whereby when soil to be irrigated covers the at least two passages water from the reservoir can flow out of one of said passages only upon entrance of air through the other passage and the flow is stopped when the water after passing said distance covers the other passage, preventing further entrance of air through said other passage allowing a vacuum to be formed in the reservoir above the level of water introduced therein.

10. Automatic irrigation device for cultivated soil comprising a container (40) surrounding a reservoir for water and having an opening for introduction of the water, a removable sealing means airtightly sealing said opening, at least two open capillary tubes (46, 47), said at least two capillary tubes each having an upper end airtightly seated in the container wall and having a lower end being located in the lowermost portion of said reservoir for the discharge of water from the reservoir (9) and for the entrance of air into the reservoir, said reservoir being airtightly sealed by said container (40) and said sealing means (11) except for the communication with the exterior by said at least two open capillary tubes (46, 47), said upper ends of said at least two capillary tubes spaced apart by a distance which is less than n·3 cm wherein n is the number of liters of the reservoir volume, whereby when soil to be automatically irrigated covers the upper ends of said two open capillary tubes water from the reservoir can be discharged from one of the capillary tubes only upon entrance of air through the other capillary tube and the discharge is stopped when the water after passing said distance reaches the upper end of the other capillary tube, preventing further entrance of air through the other capillary tube allowing a vacuum to be formed in the reservoir above the level of water introduced therein.

* * * * *